US011216571B2

United States Patent
Poe et al.

(10) Patent No.: US 11,216,571 B2
(45) Date of Patent: Jan. 4, 2022

(54) CREDENTIALED ENCRYPTION

(71) Applicant: HEWLETT-PACKARD DEVELOPMENT COMPANY, L.P., Houston, TX (US)

(72) Inventors: Daryl T Poe, Fort Collins, CO (US); Christoph Graham, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 255 days.

(21) Appl. No.: 16/080,262

(22) PCT Filed: Feb. 13, 2017

(86) PCT No.: PCT/US2017/017670
§ 371 (c)(1),
(2) Date: Aug. 27, 2018

(87) PCT Pub. No.: WO2018/147878
PCT Pub. Date: Aug. 16, 2018

(65) Prior Publication Data
US 2019/0065770 A1    Feb. 28, 2019

(51) Int. Cl.
*G06F 21/62* (2013.01)
*H04L 9/32* (2006.01)
(Continued)

(52) U.S. Cl.
CPC ........ *G06F 21/6218* (2013.01); *G06F 21/602* (2013.01); *G06F 21/6209* (2013.01);
(Continued)

(58) Field of Classification Search
CPC ............... G06F 21/6218; G06F 21/602; G06F 21/6209; G06F 21/629; H04L 9/0816; H04L 9/088; H04L 9/321
See application file for complete search history.

(56) References Cited

U.S. PATENT DOCUMENTS 8,175,276 B2    5/2012    Tkacik et al.
8,578,157 B2    11/2013   Pestoni et al.
(Continued)

FOREIGN PATENT DOCUMENTS

| CN | 1682490 A   | 10/2005 |
|----|-------------|---------|
| CN | 102948114 A | 2/2013  |
| CN | 103503408 A | 1/2014  |

OTHER PUBLICATIONS

Pappala, "Device Specific Key Generation Technique For Anti-Counterfeiting Methods Using FPGA Based Physically Unclonable Functions and Artificial Intelligence", Theses and Dissertations, Paper 397, Retrieved from internet—https://utdr.utoledo.edu/cgi/viewcontent.cgi?referer=&httpsredir=1&article=1418&context=theses-dissertations, 2012, 142 Pages.

(Continued)

*Primary Examiner* — Ashokkumar B Patel
*Assistant Examiner* — William B Jones
(74) *Attorney, Agent, or Firm* — Michael A. Dryja

(57) ABSTRACT

Examples associated with credentialed encryption are described. One example method includes receiving an encryption request from a local process via a secure channel. The encryption request includes a credential associated with the local process. Whether the local process is authorized to access an encryption function is verified using the credential. The encryption function specified in the encryption request is performed using a security key unique to a system performing the method. A result of the encryption function is provided to the local process.

11 Claims, 5 Drawing Sheets

(51) Int. Cl.
*H04L 9/08* (2006.01)
*G06F 21/60* (2013.01)

(52) U.S. Cl.
CPC ............ *G06F 21/629* (2013.01); *H04L 9/088* (2013.01); *H04L 9/0816* (2013.01); *H04L 9/321* (2013.01)

(56) References Cited

U.S. PATENT DOCUMENTS

| | | |
|---|---|---|
| 8,914,635 B2 | 12/2014 | Parrish |
| 9,887,836 B1* | 2/2018 | Roth ................... H04L 9/0822 |
| 2003/0079143 A1 | 4/2003 | Mikel et al. |
| 2007/0180239 A1* | 8/2007 | Fujibayashi ........ G06F 11/1076 713/165 |
| 2009/0106551 A1 | 4/2009 | Boren et al. |
| 2012/0017095 A1 | 1/2012 | Blenkhorn et al. |
| 2013/0198521 A1 | 8/2013 | Wu |
| 2013/0227286 A1 | 8/2013 | Brisson |
| 2015/0006907 A1 | 1/2015 | Brouwer et al. |
| 2015/0134962 A1 | 5/2015 | Mikel et al. |
| 2015/0280911 A1 | 10/2015 | Andoni |
| 2016/0234176 A1* | 8/2016 | Chu ....................... H04L 63/06 |
| 2017/0006064 A1 | 1/2017 | Agarwal et al. |
| 2019/0312863 A1* | 10/2019 | Chow ................... H04L 9/0643 |

OTHER PUBLICATIONS

Wikipedia, Microsoft Office Password Protection, Internet https://en.wikipedia.org/w/index.php?title=Microsoft_office_protection&oldid=757773530.

* cited by examiner

CREDENTIALED ENCRYPTION

BACKGROUND

Modern computer systems rely on a variety of techniques to maintain security of the systems and communications transmitted by the systems. These techniques may, in various examples, prevent malicious applications from damaging the systems, intercepting messages between two trusted operating systems, stealing data at rest, and so forth. In some examples, secret keys are used to facilitate encrypting data and/or messages.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with credentialed encryption are described. As discussed above, computing systems may rely on secret keys to prevent malicious applications from damaging the systems, intercepting messages, and/or stealing data. Consequently, it is desirable to prevent the secret keys from becoming compromised, and, in the event a key is compromised, limit the data that can be accessed using that key.

Consequently, example systems and methods described herein may employ a secure local service to perform encryption and decryption using these secret keys without exposing the keys to other entities. The secure local service may rely on credentials received from processes seeking to access the secrets to determine whether to perform the encryption or decryption for the processes. Additionally, the secure local service may perform these encrypting and decrypting actions using keys that are unique to the system on which the secure local service is operating. Consequently, if the keys are compromised on one system, the same keys may not be usable on other systems, limiting the effects of keys being compromised.

As used herein, the term "encryption function" may include a variety of functions related to the obfuscation or de-obfuscation of data, among other functions. These functions may include, for example, encrypting data, decrypting data, compressing data, decompressing data, and so forth. In many examples, an encryption function may be completed by performing a mathematical operation on a first string in conjunction with a key. The key may be a series of binary digits that has a set of known mathematical properties (e.g., length, relationship to prime numbers) that establish a threshold level of security guarantees. When the encryption function causes encryption of data, the first string may be a data string, and the mathematical function may create a cipher string. When the encryption function is a decryption function, the first string may be a cipher string and the mathematical function may create a data string.

Figure 1:
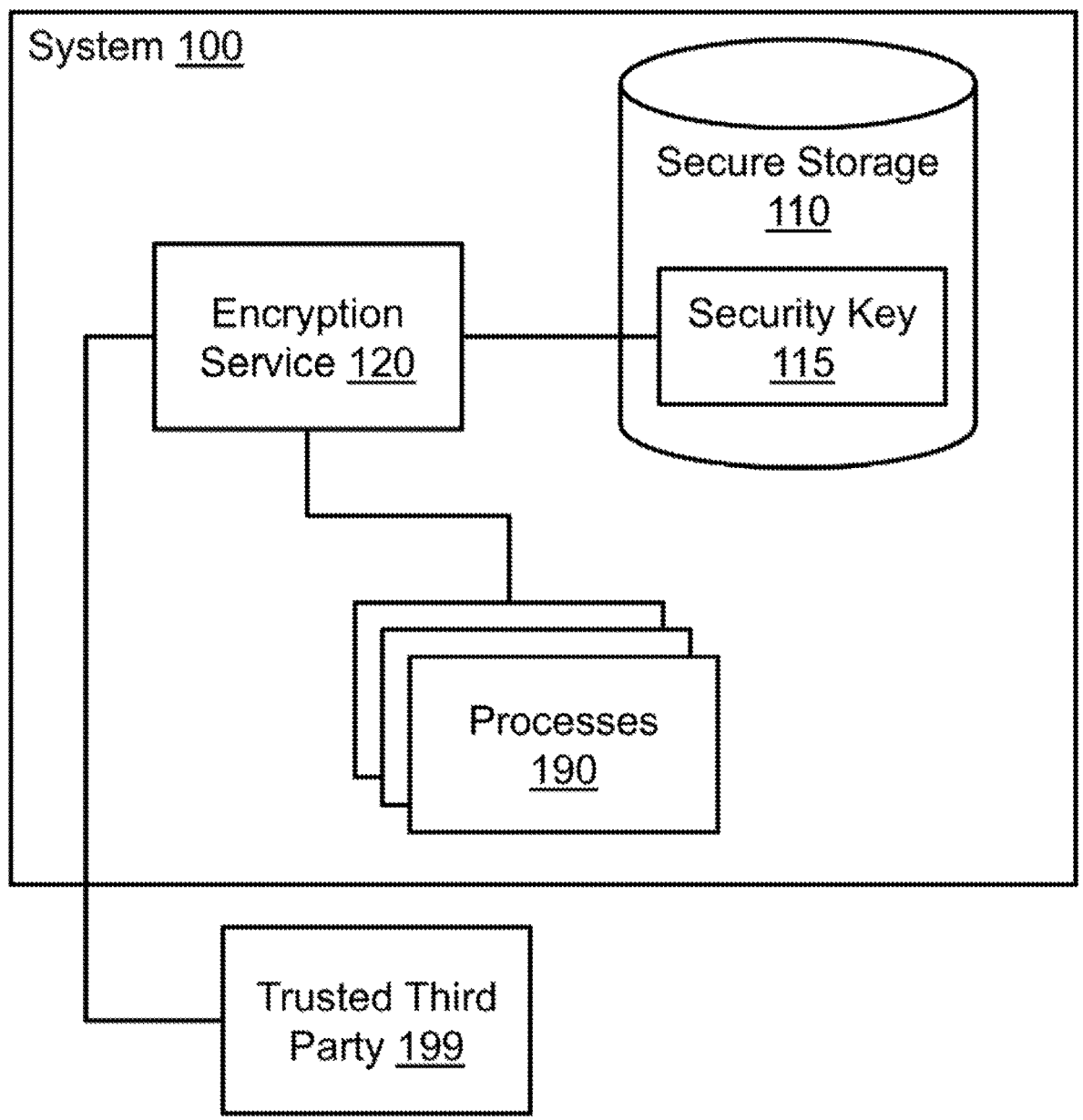
FIG. 1 illustrates an example system associated with credentialed encryption.

FIG. 1 illustrates an example system associated with credentialed encryption. It should be appreciated that the items depicted in FIG. 1 are illustrative examples, and many different systems, devices, and so forth, may operate in accordance with various examples.

FIG. 1 illustrates an example system 100. System 100 includes a secure storage 110. Secure storage 110 may store a set of encrypted security keys 115. The security keys may be generated to be effectively unique to system 100, such that there is a low likelihood that any two systems will generate or use the same security key. Security keys 115 may be used by system 100 for securing various aspects of system 100 from malicious entities that seek to compromise system 100. These malicious entities may seek to damage system 100, steal data from system 100, intercept communications between system 100 and other systems, and so forth. In various examples, the security keys 115 may be used by system 100 to, for example, restrict access to aspects of system 100, encrypt data on system 100, and so forth. By way of illustration, the keys may be used to encrypt various credentials and private data of applications and/or users of system 100.

In various examples, security keys 115 may be generated at a variety of times during the life cycle of system 100 to serve different goals. For examples, security keys 115 may be generated when system 100 is first initiated, when encryption service 120 is first initiated, when a new user is added and/or activated, when a new application requests secure storage, and so forth. Security keys 115 may be also generated and embedded in secure storage 110 during production of system 100. In other examples, security keys 115 may also be periodically generated to reduce a likelihood that a security key 115 is compromised as certain encryption techniques may be vulnerable to determining a security key 115 the more frequently the security key 115 is used.

To access the security keys 115, system 100 includes an encryption service 120. Encryption service 120 may interface between processes 190 and secure storage 110, and perform encryption functions using security keys 115. Thus, system 100 may be configured to ensure that only encryption service 120 has access to security keys 115, and that access to security keys 115 is restricted to other entities. This may cause other processes seeking to take advantage of the security keys to use encryption service 120. By way of illustration, when a process 190 seeks to have data encrypted or decrypted using security key 115, process 190 may request encryption service 120 perform this function as opposed to directly accessing security key 115.

In various examples, processes 190 may communicate with encryption service 120 via a secure channel. For example, if a system 100 is operating using a Linux operating system, the local process may transmit the encryption request using an abstract Unix domain socket. Other available secure channels may depend on the configuration of system 100.

Consequently, when a process 190 seeks to encrypt or decrypt data using a security key 115, encryption service 120 may first exchange credentials with that process 190. Credentials of the process 190 may include, for example, process identifiers, process paths, access privileges of the process, and so forth. It may be desirable to ensure that credentials provided to encryption service 120 cannot be spoofed by processes 190. In the example above where system 100 is a Linux based system, credentials may be provided using socket ancillary data. The credential provided by encryption service 120 to processes 190 may ensure the processes 190 know they are not transmitting data to a malicious process seeking to capture sensitive data.

In some examples, encryption service 120 may consider other factors when determining whether processes 190 may access encryption functions using security keys 115. These other factors may include, for example, temporal information (e.g., date and time), how many times a security key has been accessed, how many times data has been decrypted, time-to-live information, whether a security process is operating on system 100, geolocation information, whether a trusted third party service is accessible, roles and/or policies associated with a user and/or application seeking to access encryption service 120 and so forth.

When encryption service 120 determines that a process 190 is authorized to encrypt or decrypt data using security keys 115, encryption service 120 may perform an encryption function requested by process 190. When the authorization fails, encryption service 120 may, for example, notify process 190 of the failure, perform an encryption function using a technique that does not access security key 115, notify a security process, and so forth.

In some examples, further data security may be achieved by verifying that processes 190 are authorized to access data they seek to decrypt prior to providing decrypted data to the processes 190. To achieve this, encryption service 120 may append credentials of processes 190 encrypting data strings to the data strings the processes seek to encrypt. When a process 190 seeks to decrypt data, a credential may be retrieved from the decrypted data and compared to a credential provided by the process 190 seeking decryption of that data. When the two match, the decrypted data may be provided to the process 190. If the credential provided by the process 190 and the credential retrieved from the decrypted data do not match, encryption service 120 may refuse to provide the decrypted data to the process 120, notify an entity invested in the security of system 100 (e.g., a user), and so forth.

In some examples, it may be desirable to have an alternative method of decrypting data. This alternative method may involve dividing a result of an encryption function seeking to encrypt data into multiple segments. A first segment may be provided to the process 190 initiating the encryption of the data. A second segment may be stored in secure storage 110 or in another secure location accessible by encryption service 120. And a third segment may be provided to a trusted third party 199. These segments may be generated so that a combination of two of the segments can be used to decrypt the original data. Dividing the segments in this manner may facilitate recovering the original data in the event that one of encryption service 120, process 190, and trusted third party 199 have become compromised. Similarly, if data loss or data corruption occurs at one of encryption service 120, process 190, and trusted third party 199, the original decrypted data may be obtainable under the cooperation of the other two.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
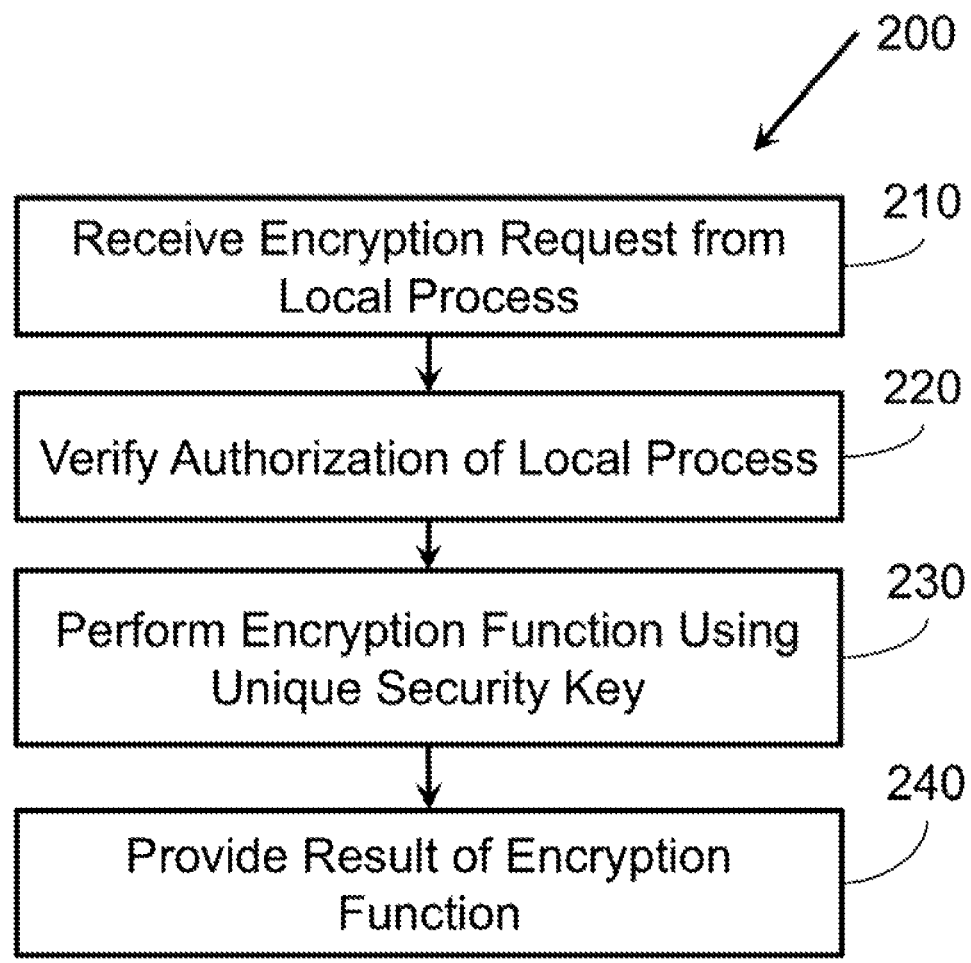
FIG. 2 illustrates a flowchart of example operations associated with credentialed encryption.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with credentialed encryption. Method 200 includes receiving an encryption request at 210. The encryption request may be received from a local process. The encryption request may be received via a secure channel. As described above, what type of secure channel is used may depend on the configuration of a system performing method 200. The encryption request may include a credential associated with the local processes. The credential may be, for example, a path associated with the process, a process identifier, a proof of access to a system file, and so forth.

In some examples, method 200 may include providing a credential to the local process (not shown). Providing the credential to the local process may prove to the local process that an actor performing method 200 is who the process claims to be. This may allow the local process to be sure it is not transmitting data to a malicious process.

Method 200 also includes verifying whether the local process is authorized to access an encryption function at 220. The authorization may be verified based on the credential. Other factors may also be considered when authorizing access to the encryption function by the local process. These factors may include process identifiers, file accesses, and so forth.

Method 200 also includes performing an encryption function at 230. The encryption function performed at action 230 may be specified in the encryption request. The encryption function may be, for example, encrypting data, decrypting data, and so forth. When the encryption function involves encrypting data, the encryption function may include the credential with data encrypted by the encryption function. Similarly, when the encryption function involves decrypting data, method 200 may include verifying the credential against a credential retrieved from the data. Verifying the credential of the local process against the credential retrieved from the data may facilitate verifying that the local process is authorized to access the data decrypted as a result of performing the encryption function. The encryption function may be performed using a security key unique to a system performing method 200.

In some examples, method 200 may include generating the security key (not shown) during an initial setup of the system performing method 200. By way of illustration, the security key may be generated the first time the system performing method 200 is initiated, when a process performing method 200 is first initiated and so forth. Security keys may be generated at other times appropriate for ensuring security of systems performing method 200.

Method 200 also includes providing a result of the encryption function at 240. The result may be provided to the local process.

Figure 3:
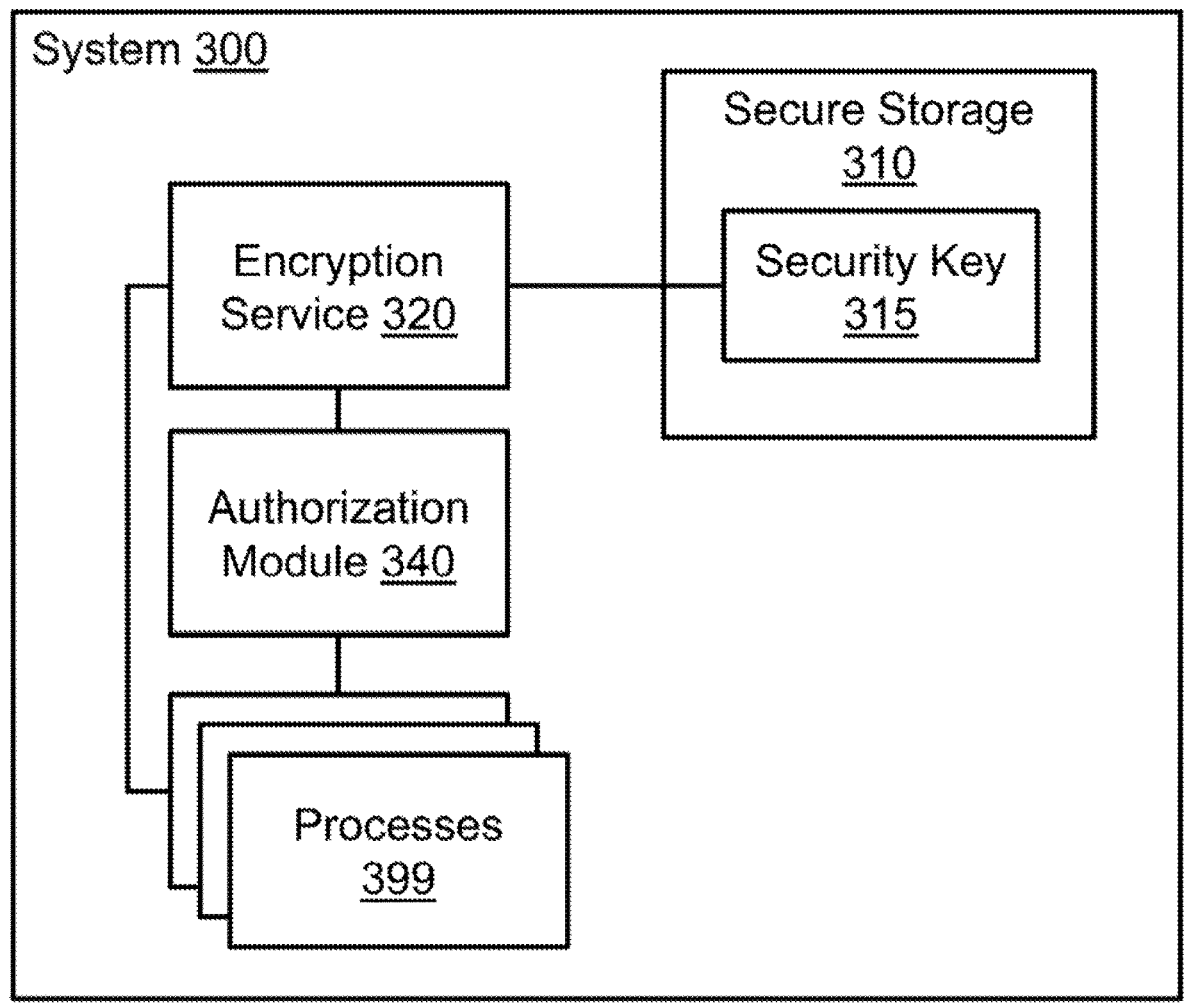
FIG. 3 illustrates an example system associated with credentialed encryption.

FIG. 3 illustrates a system 300 associated with credentialed encryption. System 300 includes a secure storage 310. Secure storage 310 stores a security key 315. The security key may be unique to system 300.

System 300 also includes an encryption service 320. Encryption service 320 may perform encryption and decryption using security key 315 for processes 399 operating on system 300. In some examples, encryption service 320 may perform encryption of data such that the encrypted data is retrievable by each combination of two of encryption service 320, the process 399 requesting the encryption, and a trusted third party (not shown).

System 300 also includes an authorization module 340. Authorization module 340 may receive a credential associated with a process 399 operating on system 300. Authorization module 320 may determine, based on the credential, whether the process 399 is authorized to access the encryption service 320. In some examples, authorization module 340 may determine whether processes 399 are authorized to access encryption service 320 based on, a current time, a date, whether an application is operating on the system, whether a time-to-live has expired, and how many times data has been decrypted.

In some examples, system 300 may include a key generation module (not shown). The key generation module may create security key 315. Security key 315 may be created during an initialization of one of, system 300, encryption service 320, and so forth.

Figure 4:
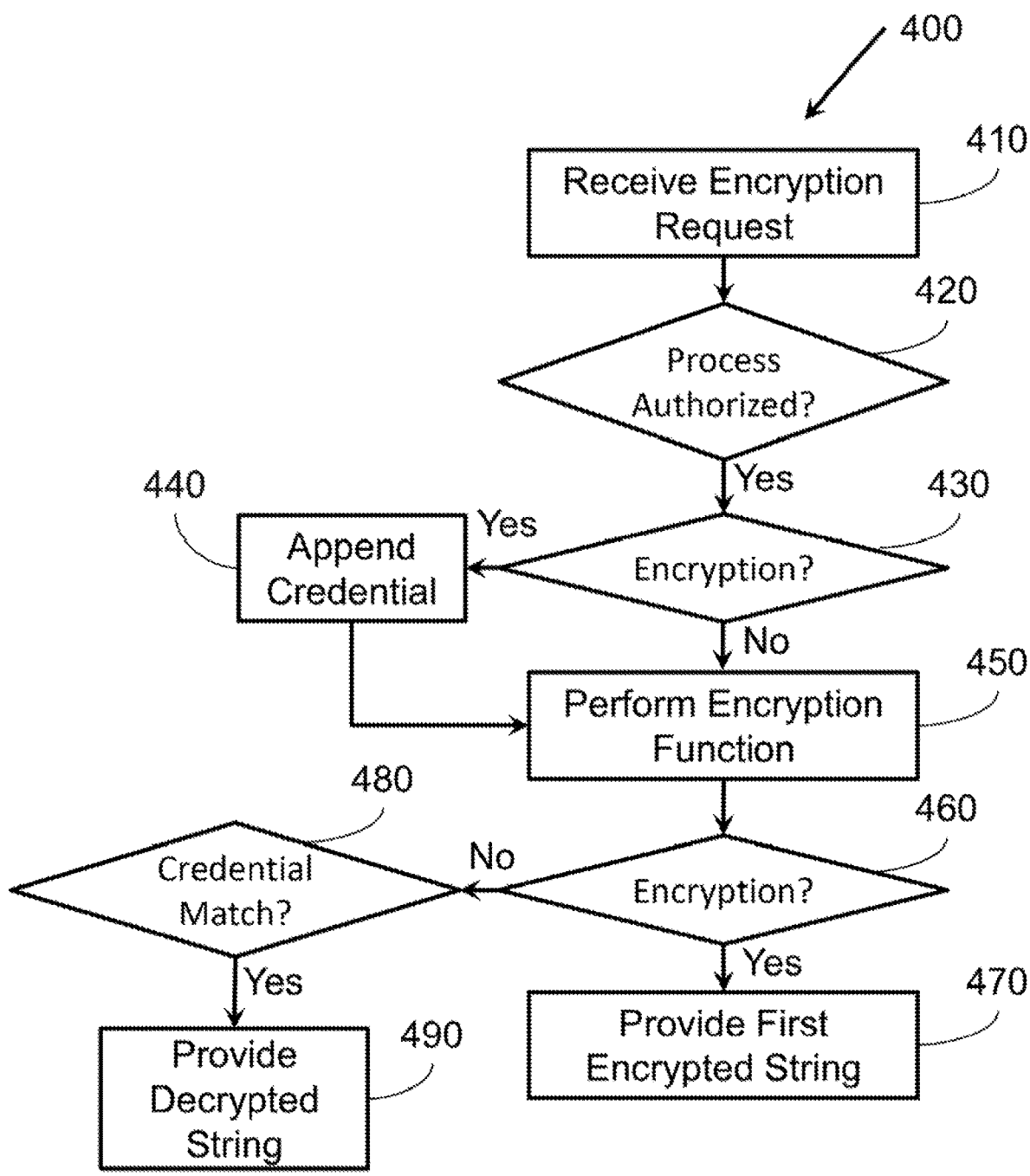
FIG. 4 illustrates another flowchart of example operations associated with credentialed encryption.

FIG. 4 illustrates a method 400 associated with credentialed encryption. Method 400 includes receiving an encryption request at 410. The encryption request may be received via a secure channel. The encryption request may identify a credential associated with a local process. The encryption request may also identify a data string. The encryption request may also identify an encryption function to be performed on the data string. In some examples, method 400 may also include providing a credential to the process associated with the credential.

Method 400 also includes verifying whether the process is authorized to access the encryption function at 420. This verification may be performed based on the credential associated with the process. The verification may also be performed based on, for example, a current time, a date, whether a security process is being co-executed by a processor performing method 400, whether a time-to-live has expired, how many times the data string has been decrypted, and so forth. When the process is authorized to access the encryption function, method 400 may proceed to action 430 where it is determined whether the encryption function involves encrypting the data string. When the data string is to be encrypted, method 400 may proceed to action 440 and append the credential associated with the process to the data string.

After appending the credential to the data string, or if the encryption function is found not to involve encrypting the data string at 430, method 400 may proceed to action 450 and perform the encryption function specified in the encryption request. The encryption function may be performed using a security key unique to a system in which a processor performing method 400 is embedded.

At action 460, method 400 may again evaluate whether the encryption function involves encrypting the data string. When the encryption function causes encryption of the data string, method 400 may proceed to action 470 and provide a first encrypted string to the process whose credential was provided in the encryption request. The first encrypted string may be obtained from the encryption function. In some examples method 400 may also include providing a second encrypted string to a remote trusted third party, and storing a third encrypted string in a secure storage. In these examples, the data string may be retrievable from each combination of two of the first encrypted string, the second encrypted string, and the third encrypted string.

When the encryption function involves decrypting the data string, method 400 may proceed to action 480 and determine whether a credential retrieved when decrypting the data string matches the credential associated with the process. If these credentials match, method 400 may proceed to action 490 and provide a decrypted string to the process whose credential was provided in the encryption request. The decrypted string may be obtained from the encryption function as a result of decrypting the data string.

Figure 5:
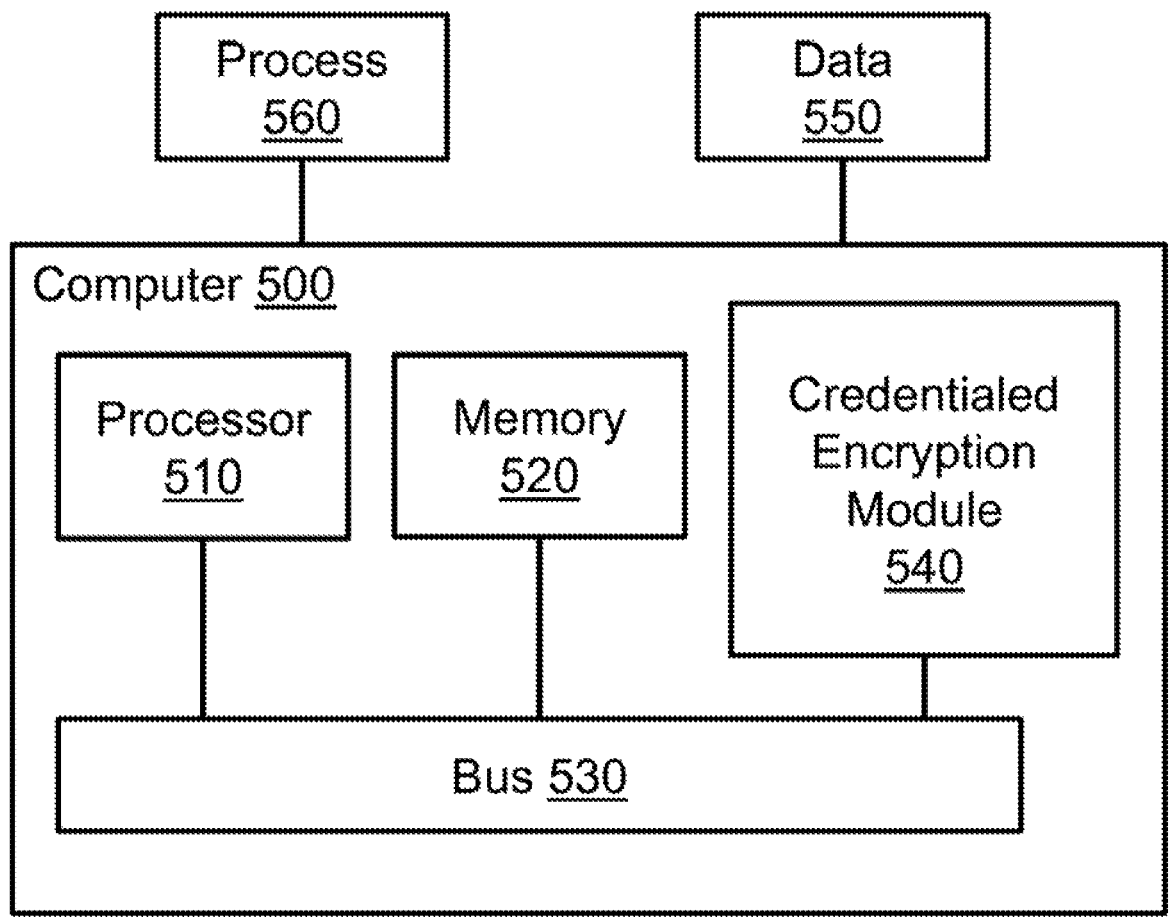
FIG. 5 illustrates an example computing device in which example systems, and methods, and equivalents, may operate.

FIG. 5 illustrates an example computing device in which example systems and methods, and equivalents, may operate. The example computing device may be a computer 500 that includes a processor 510 and a memory 520 connected by a bus 530. Computer 500 includes a credentialed encryption module 540. Credentialed encryption module 540 may perform, alone or in combination, various functions described above with reference to the example systems, methods, and so forth. In different examples, credentialed encryption module 540 may be implemented as a non-transitory computer-readable medium storing processor-executable instructions, in hardware, software, firmware, an application specific integrated circuit, and/or combinations thereof.

The instructions may also be presented to computer 500 as data 550 and/or process 560 that are temporarily stored in memory 520 and then executed by processor 510. The processor 510 may be a variety of processors including dual microprocessor and other multi-processor architectures. Memory 520 may include non-volatile memory (e.g., read-only memory) and/or volatile memory (e.g., random access memory). Memory 520 may also be, for example, a magnetic disk drive, a solid state disk drive, a floppy disk drive, a tape drive, a flash memory card, an optical disk, and so on. Thus, memory 520 may store process 560 and/or data 550. Computer 500 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
receiving, by a service of and executing on a system, an encryption request from a local process of and executing on the system via a secure channel, where the service is not the local process, the encryption request includes a credential associated with the local process, the encryption request provides data and specifies an encryption function that is requested to be performed by the service on the data, and the encryption function is to encrypt the provided data;

responsive and subsequent to receipt of the request, verifying, by the service and using the credential, that the local process is authorized to access the encryption function specified in the encryption request;

responsive and subsequent to verification, performing, by the service, the encryption function specified in the encryption request using a security key unique to the system, without exposing the security key to the local process, to generate a result of the encryption function; and subsequent to performance of the encryption function;
providing, by the service, a first segment of the result of the encryption function to the local process via the secure channel;
storing, by the service, a second segment of the result of the encryption function within a secure location accessible by the service; and
providing, by the service, a third segment of the result of the encryption function to a trusted third party,
wherein the provided data is decryptable from any two of the first, second, and third segments.

2. The method of claim 1, where the encryption function includes the credential in the data encrypted by the encryption function.

3. The method of claim 1, further comprising generating the security key during an initial setup of the system.

4. The method of claim 1, further comprising providing a credential to the local process.

5. The method of claim 1, where the credential associated with the local process is a path associated with the local process, a process identifier, or proof of access to a system file.

6. A system comprising:
a secure storage to store a security key unique to the system; and
an encryption service to perform encryption and decryption using the security key for local processes executable on the system by:
receiving an encryption request from a local process via a secure channel, where the encryption service is not the local process, the encryption request includes a credential associated with the local process, the encryption request provides data and specifies an encryption function that is requested to be performed by the service on the data, and the encryption function is to encrypt the provided data;
responsive and subsequent to receipt of the request, verifying, using the credential, that the local process is authorized to access the encryption function specified in the encryption request;
responsive and subsequent to verification, performing the encryption function specified in the encryption request using the security key, without exposing the security key to the local process, to generate a result of the encryption function; and
subsequent to performance of the encryption function;
providing a first segment of the result of the encryption function to the local process;
storing a second segment of the result of the encryption function within the secure storage; and
providing a third segment of the result of the encryption function to a trusted third party,
wherein the provided data is decryptable from any two of the first, second, and third segments.

7. The system of claim 6, comprising a key generation module to generate the security key during an initialization of one of, the system and the encryption service.

8. The system of claim 6, where the encryption services verifies that the local process is authorized to access the encryption function also based on a current time, a date, whether an application is operating on the system, whether a time-to-live has expired, and/or how many times data has been decrypted.

9. A non-transitory computer-readable medium storing processor executable instructions that when executed causes a service of a system to:
receive, via a secure channel, an encryption request from a local process, where the service is not the local process, where the encryption request identifies a credential associated with the local process, a data string, and an encryption function that is requested to be performed by the service on the data string, and where the encryption function is to encrypt the data string;
responsive and subsequent to receipt of the encryption request, verify that the local process is authorized to access the encryption function based on the credential associated with the local process;
responsive and subsequent to verification:
append the credential associated with the local process to the data string prior to encrypting the data string;
perform the encryption function on the data string using a security key unique to the system to encrypt the data string, without exposing the security key to the local process, to generate an encrypted string; and
subsequent to performance of the encryption function;
provide a first segment of the encrypted string to the local process;
store a second segment of the encrypted string within a secure location accessible by the service;
provide a third segment of the encrypted string to a trusted third party,
wherein the data string is decryptable from any two of the first, second, and third segments.

10. The non-transitory computer-readable medium of claim 9, where the instructions further cause the service to provide a credential to the local process.

11. The non-transitory computer-readable medium of claim 9, where whether the local process is authorized to access the encryption function further depends on a current time, a date, whether a security process is being co-executed by the processor, whether a time-to-live has expired, and/or how many times the data string has been decrypted.

* * * * *